United States Patent [19]

Broemer et al.

[11] 4,200,467

[45] Apr. 29, 1980

[54] ZIRCONIUM-CONTAINING BOROSILICATE GLASSES

[75] Inventors: Heinz Bröemer, Hermannstein; Werner Huber; Norbert Meinert, both of Solms-Albshausen, all of Fed. Rep. of Germany

[73] Assignee: Ernst Leitz Wetzlar GmbH, Wetzlar, Fed. Rep. of Germany

[21] Appl. No.: 919,998

[22] Filed: Jun. 28, 1978

[30] Foreign Application Priority Data

Jul. 1, 1977 [DE] Fed. Rep. of Germany ....... 2729706

[51] Int. Cl.$^2$ ............................ C03C 3/08; C03C 3/30
[52] U.S. Cl. .................................. 106/47 Q; 106/52; 106/53; 106/54
[58] Field of Search .................... 106/54, 47 Q, 52, 53

[56] References Cited

U.S. PATENT DOCUMENTS

| | | | |
|---|---|---|---|
| 3,529,980 | 9/1970 | Brömer et al. | 106/47 Q |
| 3,999,997 | 12/1976 | Faulstich et al. | 106/47 Q |
| 4,055,435 | 10/1977 | Sagara | 106/54 |
| 4,084,978 | 4/1978 | Sagara | 106/47 Q |

*Primary Examiner*—Helen M. McCarthy
*Attorney, Agent, or Firm*—Schwartz, Jeffery. Schwaab, Mack, Blumenthal & Koch

[57] ABSTRACT

Disclosed are zirconium-containing borosilicate glass compositions having a refractive index $n_e$ between 1.55 and 1.72, and Abbe number $\nu_e$ between 50 and 34 and a negative anomalous partial dispersion value $\Delta\nu_e$ between $-3.0$ and $-7.7$. Also disclosed is a process for the production of such glass compositions.

2 Claims, No Drawings

ZIRCONIUM-CONTAINING BOROSILICATE GLASSES

BACKGROUND OF THE INVENTION

The invention pertains to optical borosilicate glasses containing high zirconium concentrations and having intermediate to high refractive indices and relatively low Abbe numbers, as well as to a process for the production of such glass compositions.

The demand for optical glasses with special physical properties on the part of optical engineers has risen strongly in recent times. For the redesign of optical systems, particularly microscope and photographic lenses, optical grade glasses characterized by high refractive indices $n_e$ but at the same time possessing the lowest possible Abbe numbers $\nu_e$ are increasingly required. By using such special glasses, optical engineers are able to eliminate optical abberations in optical systems and to improve the corrective quality of an objective to a much higher degree. Anomalous partial dispersion values play a decisive role in this respect. U.S. Pat. No. 3,451,829 recites additional details concerning the significance, the application and the nomenclature of optical glasses having anomalous partial dispersions.

In addition to these purely physical properties which are demanded of advanced optical glasses, those skilled in the glass art must also consider chemical-industrial requirements, i.e., the glasses must be capable of being produced on an industrial scale and they must not have any distinct crystallization tendencies. Economical production requires melting temperatures which are not excessive. Finally, technical processing factors play an important role in the selection and use of glasses of this type.

Even though glasses with compositions containing essentially silicon dioxide ($SiO_2$), boron trioxide ($B_2O_3$), zirconium dioxide ($ZrO_2$) and alkaline earth metal oxides are known, such glasses have proven to be unsuited for industrial application, because, as a result of their distinct crystallization tendencies, they may be melted only in small and therefore uneconomical units. Were one to produce comparable glasses containing alkali metal oxides in place of alkaline earth metal oxides, the negative deviations from the so-called "standard straight line," i.e., the $(-)\Delta\nu_e$ values, would be significantly lower.

Furthermore, U.S. Pat. No. 2,150,694 describes a process for the manufacture of optical glasses having high refractive indices and low scatter, which contain, inter alia, one or more oxides of the elements titanium, yttrium, zirconium, niobium, lanthanum, tantalum and thorium. Further additives may consist of thorium and hafnium. However, such known glasses have different values in their $n_e/\nu_e$ pairs of parameters. Also, no data are given concerning the required anomaly of the partial dispersion.

SUMMARY OF THE INVENTION

It is therefore an object of the present invention to eliminate the disadvantages of known glasses and to provide optical glasses which, in addition to $n_e/\nu_e$ values which are correlated with one another, exhibit negative anomalous partial dispersions for the correction of the secondary spectrum of optically imaging systems.

It is another object of the invention to provide a process for the production of such optical glasses.

In accomplishing the foregoing objects, there has been provided in accordance with the present invention a zirconium-containing borosilicate glass composition having a refractive index $n_e$ in the range of between about $1.55 < n_e < 1.72$, an Abbe number $\nu_e$ in the range of between about $50 > \nu_e > 34$ and negative anomalous partial dispersion value $\Delta\nu_e$ between about $-3.0$ and $-7.7$ comprising the following components:

| | | |
|---|---|---|
| (a) | from about 8.4 | to 45.5% by weight $SiO_2$, and |
| | from about 0.9 | to 33.0% by weight $B_2O_3$, wherein the sum of ($SiO_2 + B_2O_3$) amounts to between about 31.6 and 46.4% by weight |
| (b) | from about 13.5 | to 18.9% by weight $ZrO_2$, wherein the sum of ($SiO_2 + B_2O_3 + ZrO_2$) amounts to between about 46.1 and 64.4% by weight; |
| (c) | 0 | to about 5.0% by weight $Li_2O$, |
| | 0 | to about 22.3% by weight $Na_2O$, |
| | 0 | to about 10.0% by weight $K_2O$, and |
| | 0 | to about 24.0% by weight NaF, wherein the sum of the alkali metal oxides ($Li_2O + Na_2O + K_2O$) amounts to between 0 and about 21.8% by weight and the sum of (alkali metal oxides + NaF) amounts to between about 8.0 and 24.0% by weight; |
| (d) | 0 | to about 2.0% by weight BaO, |
| | 0 | to about 2.3% by weight ZnO, |
| | 0 | to about 0.5% by weight CdO, and |
| | 0 | to about 5.0% by weight PbO, wherein the sum of the bivalent oxides (BaO + ZnO + CdO + PbO) amounts to between 0 and about 5.5% by weight; |
| (e) | 0 | to about 9.9% by weight $Al_2O_3$, |
| | 0 | to about 24.8% by weight $La_2O_3$, |
| | 0 | to about 23.1% by weight $Sb_2O_3$, and |
| | 0 | to about 4.0% by weight $Y_2O_3$, wherein the sum of the trivalent oxides ($Al_2O_3 + La_2O_3 + Sb_2O_3 + Y_2O_3$) amounts to between 0 and about 26.9% by weight; |
| (f) | 0 | to about 5.0% by weight $GeO_2$, and |
| | 0 | to about 1.0% by weight $TiO_2$, wherein the sum of the tetravalent oxides ($ZrO_2 + GeO_2 + TiO_2$) amounts to between about 13.5 and 20.6% by weight; |
| (g) | 0 | to about 5.0% by weight $Nb_2O_5$, and |
| | 0 | to about 33.1% by weight $Ta_2O_5$, wherein the sum of the pentavalent oxides ($Nb_2O_5 + Ta_2O_5$) amounts to between 0 and about 36.1% by weight; and |
| (h) | 0 | to about 2.1% by weight $WO_3$. |

According to a further aspect of the invention, the glass compositions may further comprise up to about 3% by weight of a modifying additive selected from $SnO_2$, $P_2O_5$ and mixtures thereof.

There has also been provided according to the present invention a process for the production of a glass composition as defined above, comprising the steps of: (a) heating the mixture of the aforesaid components in a platinum crucible to a temperature of between about 1345° and 1400° C. to form a melt; (b) refining the melt at a temperature of between about 1385° and 1450° C. for a period of time of from about 7 to 15 minutes; (c) homogenizing the melt with agitation at a temperature of between about 1360° and 1400° C. for a period of time of from about 80 to 120 minutes; (d) lowering the temperature of the melt down under agitation to a pouring temperature of between about 1135° C. and 1185° C. within a period of time of from about 3 to 8 minutes; and (e) pouring the melt into at least one preheated mold.

Further objects, features and advantages of the invention will become readily apparent from the detailed description of preferred embodiments which follows.

DETAILED DESCRIPTION OF PREFERRED EMBODIMENTS

The glasses of the present invention have the further advantages that they may be agitated down to relatively low pouring temperatures without crystallization. This alone makes it possible to obtain in larger units glasses free of striation and segregation.

Exemplary embodiments of the invention are presented in the tables which follow hereafter (in weight %). In addition to the individual components, intermediate sums of groups of components are also entered. Because of their similar effects in complex inorganic multi-component systems, these groups are suitably combined. The following physical parameters are given at the end of each vertical column:

$n_e$: refractive index
$v_e$: Abbe number (reciprocal value of dispersion)
$\theta'_g$: anomalous partial dispersion, where:

$$\theta'_g = \frac{n_g - n_F}{n_F - n_C}$$

with the meaning of the subscripts as follows:
g = blue mercury line (435.84 nm),
F' = blue cadmium line (479.99 nm),
C' = red cadmium line (643.85 nm);
$-\Delta v_e$: negative deviation from the so-called "standard straight line", such as shown graphically for example in the drawing of U.S. Pat. No. 3,451,829.

In Table 1, in addition to the principal glass forming components such as silicon dioxide ($SiO_2$) and boron trioxide ($B_2O_3$) and the essential component of zirconium dioxide ($ZrO_2$), sodium compounds and tantalum and tungsten oxides are also listed. In the process, sodium fluoride (NaF) is partially replaced by sodium oxide. The examples show that $SiO_2$ and $B_2O_3$ are most extensively interchangeable.

Table 2 presents examples which, in addition to a variation of the proportion of alkali metals, also demonstrate the effect of antimony trioxide ($Sb_2O_3$) on physical properties.

Tables 3 to 7 show examples with additional oxides of higher valence, such as germanium dioxide ($GeO_2$), titanium dioxide ($TiO_2$), lanthanum oxide ($La_2O_3$), yttrium oxide ($Y_2O_3$) and niobium pentoxide ($Nb_2O_5$). Beginning with Example 57, bivalent metallic oxides such as barium oxide (BaO), zinc oxide (ZnO) and cadmium oxide (CdO) are also added.

The process for the production of the glasses of the invention shall be demonstrated in more detail by the following example of a melt:

A weighed charge of 5 kg. consisting of
  20% by weight $SiO_2$
  23.8 by weight $B_2O_3$
  17.7 by weight $ZrO_2$
  17.9 by weight $Na_2O$
  20.6 by weight $Ta_2O_5$ is mixed well and placed by portions in a platinum crucible preheated to 1380° C. After the charge mixture has melted down, the melt is refined at 1430° C. for 10 minutes and is subsequently homogenized at 1385° C. for approximately 100 minutes with constant stirring. The temperature of the melt is then lowered under agitation conditions within a few minutes down to the pouring temperature of 1150° C. and is poured into preheated molds.

Following precision cooling, the optical parameters of the glass melted by the process described hereabove are:

$n_e = 1.641323$
$v_e = 42.23$
$\theta'_g = 0.4970$
$\Delta v_e = -7.02$

Obviously, the melting conditions to be applied vary as a function of the charge composition chosen (temperature, time), but without exceeding or going below the temperature intervals or reaction times given above.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| (Weight %) | | | | | | | | | | | | |
| $SiO_2$ | 45.5 | 40.5 | 34.4 | 28.4 | 19.4 | 16.4 | 8.4 | 40.5 | 41.7 | 41.7 | 29.7 | 25.7 |
| $B_2O_3$ | 0.9 | 0.9 | 7.0 | 13.0 | 22.0 | 25.0 | 33.0 | 0.9 | 0.9 | 0.9 | 12.9 | 16.9 |
| $\Sigma (SiO_2 + B_2O_3)$ | 46.4 | 41.4 | 41.4 | 41.4 | 41.4 | 41.4 | 41.4 | 41.4 | 42.6 | 42.6 | 42.6 | 42.6 |
| $ZrO_2$ | 18.0 | 18.0 | 18.0 | 18.0 | 18.0 | 18.0 | 18.0 | 18.0 | 18.5 | 18.5 | 18.5 | 18.5 |
| $\Sigma (SiO_2 + B_2O_3 + ZrO_2)$ | 64.4 | 59.4 | 59.4 | 59.4 | 59.4 | 59.4 | 59.4 | 59.4 | 61.6 | 61.6 | 61.6 | 61.1 |
| $Na_2O$ | — | — | — | — | — | — | — | 12.0 | 9.4 | 17.4 | 17.4 | 17.4 |
| NaF | 24.0 | 24.0 | 24.0 | 24.0 | 24.0 | 24.0 | 24.0 | 12.0 | 12.4 | 4.4 | 4.4 | 4.4 |
| $Ta_2O_5$ | 9.6 | 14.6 | 14.6 | 14.6 | 14.6 | 14.6 | 14.6 | 14.6 | 15.0 | 15.0 | 15.0 | 15.0 |
| $WO_3$ | 2.0 | 2.0 | 2.0 | 2.0 | 2.0 | 2.0 | 2.0 | 2.0 | 2.1 | 2.1 | 2.1 | 2.1 |
| $n_e$ | 1.5587 | 1.5674 | 1.5714 | 1.5811 | 1.5909 | 1.5929 | 1.5906 | 1.5831 | 1.5962 | 1.6074 | 1.6210 | 1.6221 |
| $v_e$ | 49.7 | 48.3 | 47.9 | 47.0 | 45.7 | 45.5 | 45.3 | 46.7 | 46.0 | 44.9 | 44.3 | 44.2 |
| $\theta' \times 10^{-4}$ | 4862 | 4938 | 4896 | 4949 | 4934 | 4945 | 4929 | 4916 | 4929 | 4952 | 4964 | 4962 |
| $-\Delta v_e$ | 7.2 | — | 6.6 | 3.8 | 6.1 | 5.6 | 6.9 | 6.6 | 6.2 | 5.7 | 5.4 | 5.7 |

TABLE 2

| Example | 13 | 14 | 15 | 16 | 17 | 18 | 19 | 20 | 21 | 22 | 23 | 24 |
|---|---|---|---|---|---|---|---|---|---|---|---|---|
| (Weight %) | | | | | | | | | | | | |
| $SiO_2$ | 25.7 | 13.7 | 18.1 | 16.5 | 17.3 | 24.8 | 18.9 | 17.7 | 15.7 | 21.7 | 21.7 | 21.7 |
| $B_2O_3$ | 16.9 | 28.9 | 25.4 | 23.2 | 21.4 | 15.8 | 17.2 | 20.9 | 20.9 | 20.9 | 20.9 | 20.9 |
| $\Sigma (SiO_2 + B_2O_3)$ | 42.6 | 42.6 | 43.5 | 39.7 | 38.7 | 40.6 | 36.1 | 38.6 | 36.6 | 42.6 | 42.6 | 42.6 |
| $ZrO_2$ | 18.5 | 18.5 | 18.9 | 16.8 | 16.4 | 13.5 | 15.6 | 18.5 | 18.5 | 18.5 | 18.5 | 18.5 |
| $\Sigma (SiO_2 + B_2O_3)$ | 61.1 | 61.1 | 62.4 | 56.5 | 55.1 | 54.1 | 51.7 | 57.1 | 55.1 | 61.1 | 61.1 | 61.1 |

TABLE 2-continued

| | (Weight %) | | | | | | | | | | | |
|---|---|---|---|---|---|---|---|---|---|---|---|---|
| Example | 13 | 14 | 15 | 16 | 17 | 18 | 19 | 20 | 21 | 22 | 23 | 24 |
| + ZrO$_2$) | | | | | | | | | | | | |
| Li$_2$O | — | — | — | — | — | — | — | — | — | 5.0 | — | — |
| Na$_2$O | 21.8 | 21.8 | 22.3 | 20.4 | 19.8 | 15.4 | 16.7 | 21.8 | 21.8 | 16.8 | 16.8 | 11.8 |
| K$_2$O | — | — | — | — | — | — | — | — | — | — | 5.0 | 10.0 |
| Sb$_2$O$_3$ | — | — | — | — | — | — | — | 21.1 | 23.1 | 17.1 | 17.1 | 17.1 |
| Ta$_2$O$_5$ | 15.0 | 15.0 | 15.3 | 23.1 | 25.1 | 30.5 | 31.6 | — | — | — | — | — |
| WO$_3$ | 2.1 | 2.1 | — | — | — | — | — | — | — | — | — | — |
| n$_e$ | 1.6274 | 1.6260 | 1.6312 | 1.6419 | 1.6603 | 1.6613 | 1.6807 | 1.6471 | 1.6577 | 1.6449 | 1.6415 | 1.6314 |
| ν$_e$ | 43.6 | 43.4 | 43.3 | 41.7 | 40.0 | 39.9 | 38.0 | 39.0 | 37.2 | 41.4 | 40.0 | 41.3 |
| θ$_g'$ × 10$^{-4}$ | 4961 | 4948 | 4960 | 4983 | 4994 | 5019 | 5033 | 5064 | 5098 | 5000 | 5014 | 5002 |
| −Δν$_e$ | 6.3 | 7.4 | 6.7 | 6.7 | 7.6 | 5.9 | 6.7 | 3.5 | 3.0 | 5.9 | 6.0 | 5.7 |

TABLE 3

| | (Weight %) | | | | | | | | | | | |
|---|---|---|---|---|---|---|---|---|---|---|---|---|
| Example: | 25 | 26 | 27 | 28 | 29 | 30 | 31 | 32 | 33 | 34 | 35 | 36 |
| SiO$_2$ | 12.4 | 21.7 | 21.7 | 17.7 | 17.7 | 21.7 | 21.7 | 21.7 | 21.7 | 21.7 | 17.7 | 17.7 |
| B$_2$O$_3$ | 29.0 | 20.9 | 20.9 | 24.9 | 24.9 | 20.9 | 20.9 | 20.9 | 20.9 | 20.9 | 24.9 | 24.9 |
| Σ(SiO$_2$ + B$_2$O$_3$) | 41.4 | 42.6 | 42.6 | 42.6 | 42.6 | 42.6 | 42.6 | 42.6 | 42.6 | 42.6 | 42.6 | 42.6 |
| ZrO$_2$ | 18.0 | 16.5 | 14.5 | 18.5 | 18.5 | 18.5 | 18.5 | 18.5 | 18.5 | 18.5 | 18.5 | 18.5 |
| Σ(SiO$_2$ + B$_2$O$_3$ + ZrO$_2$) | 59.4 | 59.1 | 57.1 | 61.1 | 61.1 | 61.1 | 61.1 | 61.1 | 61.1 | 61.1 | 61.1 | 61.1 |
| Na$_2$O | — | 16.8 | 16.8 | 21.8 | 21.8 | 21.8 | 21.8 | 21.8 | 21.8 | 21.8 | 21.8 | 21.8 |
| K$_2$O | — | 5.0 | 5.0 | — | — | — | — | — | — | — | — | — |
| NaF | 24.0 | — | — | — | — | — | — | — | — | — | — | — |
| La$_2$O$_3$ | — | — | — | — | — | — | — | — | — | — | 4.0 | 8.0 |
| Sb$_2$O$_3$ | 2.0 | 17.1 | 17.1 | 2.1 | 4.1 | 6.1 | 8.1 | 10.1 | 12.1 | 14.1 | 2.1 | 2.1 |
| Ta$_2$O$_5$ | 12.6 | 2.0 | 4.0 | 15.0 | 15.0 | 11.0 | 9.0 | 7.0 | 5.0 | 3.0 | 11.0 | 7.0 |
| WO$_3$ | 2.0 | — | — | — | — | — | — | — | — | — | — | — |
| n$_e$ | 1.5934 | 1.6359 | 1.6367 | 1.6286 | 1.6303 | 1.6347 | 1.6347 | 1.6363 | 1.6339 | 1.6334 | 1.6317 | 1.6336 |
| ν$_e$ | 45.0 | 40.8 | 40.6 | 43.1 | 42.8 | 42.5 | 42.0 | 41.6 | 41.6 | 41.4 | 44.6 | 43.6 |
| θ$_g'$ × 10$^{-4}$ | 4929 | 5023 | 5022 | 4958 | 4964 | 4981 | 4979 | 4992 | 5009 | 5008 | 4931 | 4948 |
| −Δν$_e$ | 7.2 | 4.7 | 5.0 | 6.9 | 6.9 | 6.0 | 6.6 | 6.2 | 5.1 | 5.2 | 7.4 | 7.2 |

TABLE 4

| | (Weight %) | | | | | | | | | | | |
|---|---|---|---|---|---|---|---|---|---|---|---|---|
| Example: | 37 | 38 | 39 | 40 | 41 | 42 | 43 | 44 | 45 | 46 | 47 | 48 |
| SiO$_2$ | 17.7 | 17.7 | 20.7 | 19.7 | 20.7 | 20.7 | 12.7 | 12.7 | 12.7 | 10.7 | 12.7 | 11.0 |
| B$_2$O$_3$ | 24.9 | 24.9 | 24.9 | 24.9 | 24.9 | 24.9 | 24.9 | 24.9 | 24.9 | 24.9 | 24.9 | 24.9 |
| Σ(SiO$_2$ + B$_2$O$_3$) | 42.6 | 42.6 | 45.6 | 44.6 | 45.6 | 45.6 | 37.6 | 37.6 | 37.6 | 35.6 | 37.6 | 35.9 |
| ZrO$_2$ | 18.5 | 18.5 | 18.5 | 16.5 | 14.5 | 14.5 | 14.5 | 14.5 | 14.5 | 14.5 | 14.5 | 14.5 |
| Σ(SiO$_2$ + B$_2$O$_3$ + ZrO$_2$) | 61.1 | 61.1 | 64.1 | 61.1 | 60.1 | 60.1 | 52.1 | 52.1 | 52.1 | 50.1 | 52.1 | 50.4 |
| Na$_2$O | 21.8 | 19.8 | 16.0 | 14.0 | 12.0 | 8.0 | 10.0 | 11.0 | 12.0 | 12.0 | 12.0 | 12.0 |
| La$_2$O$_3$ | 12.0 | 10.0 | 13.8 | 17.8 | 20.8 | 24.8 | 12.8 | 6.8 | 16.8 | 12.8 | 6.8 | 6.8 |
| Sb$_2$O$_3$ | 2.1 | 2.1 | 2.1 | 2.1 | 2.1 | 2.1 | 10.1 | 15.1 | 2.1 | 10.1 | 10.1 | 14.1 |
| Y$_2$O$_3$ | — | — | — | — | — | — | — | — | 4.0 | — | — | — |
| GeO$_2$ | — | — | — | — | — | — | — | — | — | 2.0 | 4.0 | 1.7 |
| Ta$_2$O$_5$ | 3.0 | 7.0 | 4.0 | 5.0 | 5.0 | 5.0 | 15.0 | 15.0 | 13.0 | 13.0 | 15.0 | 15.0 |
| n$_e$ | 1.6292 | 1.6386 | 1.6376 | 1.6475 | 1.6487 | 1.6616 | 1.6936 | 1.6875 | 1.6863 | 1.6884 | 1.6750 | 1.6875 |
| ν$_e$ | 45.5 | 44.7 | 46.4 | 46.5 | 47.4 | 47.9 | 39.8 | 37.8 | 43.5 | 39.7 | 39.5 | 37.9 |
| θ$_g'$ × 10$^{-4}$ | 4920 | 4928 | 4914 | 4930 | 4904 | 4904 | 5022 | 5051 | 4965 | 4997 | 5021 | 5047 |
| −Δν$_e$ | 7.2 | 7.5 | 6.8 | 5.5 | 6.5 | 6.0 | 5.8 | 5.8 | 6.1 | 7.7 | 6.3 | 6.0 |

TABLE 5

| | (Weight %) | | | | | | | | | | | |
|---|---|---|---|---|---|---|---|---|---|---|---|---|
| Example: | 49 | 50 | 51 | 52 | 53 | 54 | 55 | 56 | 57 | 58 | 59 | 60 |
| SiO$_2$ | 12.7 | 12.7 | 19.1 | 18.3 | 18.1 | 19.1 | 19.1 | 19.1 | 19.0 | 18.1 | 19.0 | 19.1 |
| B$_2$O$_3$ | 24.9 | 24.9 | 16.4 | 16.7 | 16.5 | 17.4 | 17.4 | 17.4 | 17.3 | 25.4 | 17.3 | 17.4 |
| Σ(SiO$_2$ + B$_2$O$_3$) | 37.6 | 37.6 | 35.5 | 35.0 | 34.6 | 36.5 | 36.5 | 36.5 | 36.3 | 43.5 | 36.3 | 36.5 |
| ZrO$_2$ | 14.5 | 15.0 | 16.5 | 15.8 | 15.6 | 16.5 | 16.5 | 16.5 | 16.4 | 18.9 | 16.4 | 16.5 |
| Σ(SiO$_2$ + B$_2$O$_3$ + ZrO$_2$) | 52.1 | 52.6 | 52.0 | 50.8 | 50.2 | 53.0 | 53.0 | 53.0 | 52.7 | 62.4 | 52.7 | 53.0 |
| Na$_2$O | 12.0 | 12.0 | 16.9 | 16.3 | 16.2 | 16.9 | 16.9 | 16.9 | 16.8 | 20.0 | 16.8 | 15.9 |
| BaO | — | — | — | — | — | — | — | — | — | — | — | 1.0 |
| ZnO | — | — | — | — | — | — | — | — | 0.5 | 2.3 | — | — |
| CdO | — | — | — | — | — | — | — | — | — | — | 0.5 | — |
| Al$_2$O$_3$ | 2.0 | 9.9 | 1.0 | — | — | — | — | — | — | — | — | — |
| La$_2$O$_3$ | 8.8 | — | — | — | — | — | — | — | — | — | — | — |
| Sb$_2$O$_3$ | 10.1 | — | — | — | — | — | — | — | — | — | — | — |
| Y$_2$O$_3$ | — | 0.2 | — | — | — | — | — | — | — | — | — | — |
| GeO$_2$ | — | — | — | 4.0 | 5.0 | — | — | — | — | — | — | — |

TABLE 5-continued (Weight %)

| Example: | 49 | 50 | 51 | 52 | 53 | 54 | 55 | 56 | 57 | 58 | 59 | 60 |
|---|---|---|---|---|---|---|---|---|---|---|---|---|
| $Nb_2O_5$ | — | — | 1.0 | — | — | 1.0 | 3.0 | — | 3.0 | — | 3.0 | 1.0 |
| $Ta_2O_5$ | 15.0 | 15.0 | 29.1 | 28.9 | 28.6 | 29.1 | 27.1 | 29.1 | 27.0 | 15.3 | 27.0 | 29.1 |
| $TiO_2$ | — | — | — | — | — | — | — | 1.0 | — | — | — | — |
| $n_e$ | 1.6705 | 1.6830 | 1.6778 | 1.6769 | 1.6742 | 1.6808 | 1.6835 | 1.6814 | 1.6817 | 1.6334 | 1.6806 | 1.6803 |
| $v_e$ | 40.0 | 39.4 | 38.1 | 38.6 | 38.8 | 38.0 | 37.5 | 37.7 | 37.7 | 43.2 | 37.8 | 38.2 |
| $\theta'_g \times 10^{-4}$ | 5017 | 5021 | 5035 | 5026 | 5021 | 5035 | 5040 | 5047 | 5046 | 4949 | 5049 | 5040 |
| $-\Delta v_e$ | 5.8 | 6.3 | 6.6 | 6.7 | 6.9 | 6.7 | 6.8 | 6.2 | 6.3 | 7.5 | 5.9 | 6.2 |

TABLE 6

(Weight %)

| Example: | 61 | 62 | 63 | 64 | 65 | 66 | 67 |
|---|---|---|---|---|---|---|---|
| $SiO_2$ | 19.1 | 19.0 | 18.6 | 17.4 | 17.7 | 17.5 | 17.5 |
| $B_2O_3$ | 17.4 | 17.3 | 17.0 | 15.8 | 16.1 | 15.8 | 15.8 |
| $\Sigma(SiO_2 + B_2O_3)$ | 36.5 | 36.3 | 35.6 | 33.2 | 33.8 | 33.3 | 33.3 |
| $ZrO_2$ | 16.5 | 16.4 | 16.0 | 15.2 | 15.5 | 15.6 | 15.6 |
| $\Sigma(SiO_2 + B_2O_3 + ZrO_2)$ | 53.0 | 52.7 | 51.6 | 48.4 | 49.3 | 48.9 | 48.9 |
| $Li_2O$ | — | — | — | — | 1.0 | 2.5 | 1.0 |
| $Na_2O$ | 14.9 | 16.8 | 16.4 | 15.0 | 14.4 | 12.5 | 14.0 |
| BaO | 2.0 | 0.5 | 0.5 | 0.5 | 0.5 | 0.5 | 0.5 |
| $Nb_2O_5$ | 1.0 | 3.0 | 5.0 | 3.0 | 3.0 | 3.5 | 3.5 |
| $Ta_2O_5$ | 29.1 | 27.0 | 26.5 | 33.1 | 31.8 | 32.1 | 32.1 |
| $n_e$ | 1.6811 | 1.6793 | 1.6914 | 1.7052 | 1.7050 | 1.7144 | 1.7054 |
| $v_e$ | 38.3 | 37.5 | 36.6 | 35.8 | 35.7 | 36.5 | 36.3 |
| $\theta'_g \times 10^{-4}$ | 5026 | 5059 | 5061 | 5089 | 5086 | 5061 | 5065 |
| $-v_e$ | 7.0 | 5.5 | 6.3 | 5.2 | 5.4 | 6.4 | 6.3 |

TABLE 7

(Weight %)

| Example: | 68 | 69 | 70 | 71 | 72 | 73 | 74 |
|---|---|---|---|---|---|---|---|
| $SiO_2$ | 17.4 | 17.0 | 16.8 | 16.8 | 12.7 | 16.8 | 16.6 |
| $B_2O_3$ | 15.7 | 15.3 | 15.2 | 15.2 | 24.9 | 15.2 | 15.0 |
| $\Sigma(SiO_2 + B_2O_3)$ | 33.1 | 32.3 | 32.0 | 32.0 | 37.6 | 32.0 | 31.6 |
| $ZrO_2$ | 15.2 | 14.9 | 14.7 | 14.7 | 14.5 | 14.7 | 14.5 |
| $\Sigma(SiO_2 + B_2O_3 + ZrO_2)$ | 48.3 | 47.2 | 46.7 | 46.7 | 52.1 | 46.7 | 46.1 |
| $Na_2O$ | 15.0 | 14.7 | 14.5 | 14.5 | 12.0 | 14.5 | 14.4 |
| BaO | 0.5 | 0.5 | 0.5 | 0.5 | — | 0.5 | 0.5 |
| ZnO | — | — | — | — | 2.0 | — | — |
| PbO | 2.0 | 4.0 | 5.0 | 4.0 | — | 4.0 | 4.0 |
| $La_2O_3$ | — | — | — | 1.0 | 6.8 | — | — |
| $Sb_2O_3$ | — | — | — | — | 12.1 | — | — |
| $Nb_2O_5$ | 3.0 | 3.0 | 3.0 | 3.0 | — | 3.0 | 3.0 |
| $Ta_2O_5$ | 31.2 | 30.6 | 30.3 | 30.3 | 15.0 | 30.3 | 30.0 |
| $WO_3$ | — | — | — | — | — | 1.0 | 2.0 |
| $n_e$ | 1.7041 | 1.7173 | 1.7185 | 1.7183 | 1.6866 | 1.7131 | 1.7181 |
| $v_e$ | 35.9 | 34.8 | 34.7 | 34.9 | 38.4 | 35.0 | 34.3 |
| $\theta'_g \times 10^{-4}$ | 5075 | 5102 | 5122 | 5109 | 5042 | 5097 | 5105 |
| $-\Delta v_e$ | 6.0 | 5.2 | 4.6 | 4.6 | 5.8 | 5.2 | 5.5 |

What is claimed is:

1. A zirconium-containing borosilicate glass composition having a refractive index $n_e$ in the range of between about $1.55 < n_e < 1.72$, an Abbe number $v_e$ in the range of between about $50 > v_e > 34$ and negative anomalous partial dispersion value $\Delta v_e$ between about $-3.0$ and $-7.7$, consisting essentially of the following components:

| | | | |
|---|---|---|---|
| (a) | from about 8.4 | to 45.5% by weight $SiO_2$, and | |
| | from about 0.9 | to 33.0% by weight $B_2O_3$, wherein the sum of ($SiO_2 + B_2O_3$) amounts to between about 31.6 and 46.4% by weight | |
| (b) | from about 13.5 | to 18.9% by weight $ZrO_2$, wherein the sum of ($SiO_2 + B_2O_3 + ZrO_2$) amounts to between about 46.1 and 64.4% by weight; | |
| (c) | 0 | to about 5.0% by weight $Li_2O$, | |
| | 0 | to about 22.3% by weight $Na_2O$, | |
| | 0 | to about 10.0% by weight $K_2O$, and | |
| | 0 | to about 24.0% by weight NaF, wherein the sum of the alkali metal oxides ($Li_2O + Na_2O + K_2O$) amounts to between 0 and about 21.8% by weight and the sum of (alkali metal oxides + NaF) amounts to between about 8.0 and 24.0% by weight; | |
| (d) | 0 | to about 2.0% by weight BaO, | |
| | 0 | to about 2.3% by weight ZnO, | |
| | 0 | to about 0.5% by weight CdO, and | |
| | 0 | to about 5.0% by weight PbO, wherein the sum of the bivalent oxides (BaO + ZnO + CdO + PbO) amounts to between 0 and about 5.5% by weight; | |
| (e) | 0 | to about 9.9% by weight $Al_2O_3$, | |
| | 0 | to about 24.8% by weight $La_2O_3$, | |

|     |   |                                                      |
|-----|---|------------------------------------------------------|
|     | 0 | to about 23.1% by weight $Sb_2O_3$, and              |
|     | 0 | to about 4.0% by weight $Y_2O_3$, wherein the sum of the trivalent oxides ($Al_2O_3$ + $La_2O_3$ + $Sb_2O_3$ + $Y_2O_3$) amounts to between 0 and about 26.9% by weight; |
| (f) | 0 | to about 5.0% by weight $GeO_2$, and                 |
|     | 0 | to about 1.0% by weight $TiO_2$, wherein the sum of the tetravalent oxides ($ZrO_2$ + $GeO_2$ + $TiO_2$) amounts to between about 13.5 and 20.6% by weight; |
| (g) | 0 | to about 5.0% by weight $Nb_2O_5$, and               |
|     | 0 | to about 33.1% by weight $Ta_2O_5$, wherein the sum of the pentavalent oxides ($Nb_2O_5$ + $Ta_2O_5$) amounts to between 0 and about 36.1% by weight; and |
| (h) | 0 | to about 2.1% by weight $WO_3$.                      |

2. A glass composition according to claim 1, further comprising up to about 3% by weight of a modifying additive selected from $SnO_2$, $P_2O_5$ and mixtures thereof.

* * * * *

UNITED STATES PATENT OFFICE
CERTIFICATE OF CORRECTION

Patent No. 4,200,467　　　　Dated April 29, 1980

Inventor(s) Heinz BROEMER, Werner HUBER and Norbert MEINERT

It is certified that error appears in the above-identified patent and that said Letters Patent are hereby corrected as shown below:

Title Page, under Inventors, kindly delete "BRÖEMER" and insert instead -- BROEMER --.

In Column 3, lines 28 and 29, kindly delete the entire formula and insert instead $$-- \theta'_g = \frac{n_g - n_{F'}}{n_{F'} - n_{C'}} --.$$

In Table 1, second last line, column 1, kindly delete "$\theta' \times 10^{-4}$" and insert instead -- $\theta'_g \times 10^{-4}$ --.

In Table 6, last line, column 7, kindly delete "$-v_e$" and insert instead -- $\Delta v_e$ --.

Signed and Sealed this

Fifth Day of August 1980

[SEAL]

Attest:

Attesting Officer

SIDNEY A. DIAMOND

Commissioner of Patents and Trademarks